United States Patent [19]

Berthet et al.

[11] 4,101,793

[45] Jul. 18, 1978

[54] ROTATING MACHINE USING A COOLING FLUID SUPPLIED BY A ROTATING SEAL

[75] Inventors: Michel Berthet, Gif sur Yvette; Roger Gillet, Belfort; Yves Laumond, Longjumeau; Christian Lehuen, Belfort; André Marquet, Paris, all of France

[73] Assignees: Societe Generale de Constructions Electriques et Mecaniques Alsthom S.A.; Electricite de France, Service National, both of Paris, France

[21] Appl. No.: 707,138

[22] Filed: Jul. 20, 1976

[30] Foreign Application Priority Data

Jul. 22, 1975 [FR] France .................. 75 22865

[51] Int. Cl.² ............................................. H02K 9/00
[52] U.S. Cl. .................................... 310/52; 62/505; 277/55
[58] Field of Search .............. 310/53, 55, 58, 61, 310/52, 10, 40; 62/505; 277/55

[56] References Cited

U.S. PATENT DOCUMENTS

| 2,934,655 | 4/1960 | Heller | 310/55 |
| 3,089,969 | 5/1963 | Wiedeman | 310/53 |
| 3,591,816 | 7/1971 | Sakamoto | 310/58 |
| 3,617,782 | 11/1971 | Nakamura | 310/61 |
| 3,626,717 | 12/1971 | Lorch | 310/61 |
| 3,679,920 | 7/1972 | MacNab | 310/52 |
| 3,800,174 | 3/1974 | Butterfield | 310/61 |
| 3,845,639 | 11/1974 | Smith | 62/505 |
| 3,991,588 | 11/1976 | Laskaris | 310/61 |

Primary Examiner—R. Skudy
Attorney, Agent, or Firm—Sughrue, Rothwell, Mion, Zinn and Macpeak

[57] ABSTRACT

The circulation of a low temperature cooling fluid is insured by thermal siphon effect in a cryoalternator from within a closed loop circuit containing an inner rotating seal of the "bayonet" type with a very small radial gap. Longitudinal and radial piping within the rotor permits internal circulation of cooling fluid by thermal siphon effect across the "bayonet" type rotating inner seal in the absence of positive circulation by leakage of the coolant across the inner seal radial gap.

12 Claims, 2 Drawing Figures

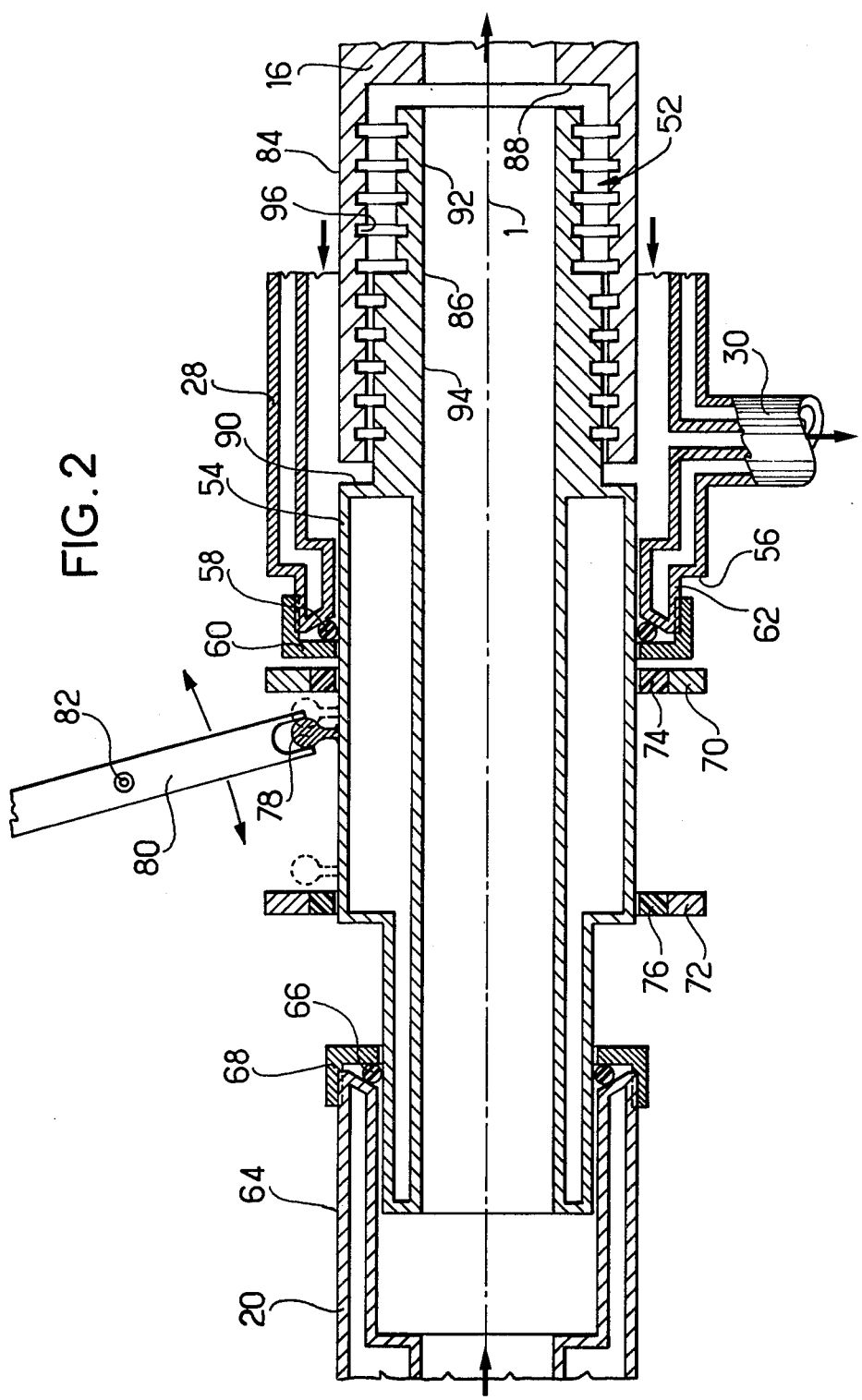

ROTATING MACHINE USING A COOLING FLUID SUPPLIED BY A ROTATING SEAL

BACKGROUND OF THE INVENTION

Field of the Invention

The present invention relates to an electric machine having a superconductive rotor provided with a cooling circuit having a seal.

In such machines, the cooling problem is particularly great because of the high cooling powers made necessary by the use of very low temperatures.

Such a machine is, for example, a cryoalternator. Its rotor, which acts as an inductor includes superconductive windings at its periphery. These windings must be kept at a very low temperature despite the heat which is generated both by electric losses in the windings and by radiation or thermal conduction.

For this reason, it has been proposed to provide the rotor with an inner cooling circuit supplied with helium at a temperature close to 4° K. The helium can be supplied by an axial rotating supply tube integral with the rotor and extended by a stationary supply tube which is also axial by means of a rotating seal. The helium can be recuperated at the outlet, cooled by a cooling device and re-injected into the supply tube by circulation means, i.e. a pump capable of operating in the special conditions required.

However, the man in the art will find numerous difficulties when he wants to produce such a cooling circuit. He can, indeed, contrive three distinct general arrangements. In a first arrangement the helium is recuperated at ambient temperature. It is then difficult, in the majority of cases, to obtain acceptable thermodynamic efficiency in the cooling system. Furthermore, systems of this type produced or described up to now include accurate guide means which are hardly compatible with the operation of an industrial machine whose availability is an essential factor. In this respect, the following documents may be quoted.

The thesis by W. DAVID LEE submitted in June, 1970, to the Massachusetts Institute of Technology (Us) entitled "Continuous transfer of liquid helium to rotating dewar" shows in a simplified theoretical approach that with laminar flow of helium in the annular gap of a bayonet coupling, the thermal losses by gaseous convection are proportional to the ninth power of the radial gap between the two parts of the seal and to the cube of the inner radius of the annular space.

The publication "Applications of superconductivity to AC rotating machines" by L. Smith et al., NATO conference 1973, superconducting Machines and Devices, NATO Advanced Study Series, Series B: Physics, vol. I, Plenum Press N. Y. which describes a cryogenic seal whose accurate guiding by means of ball bearings limits the radial play of the bayonet to 0.3 mm in order to avoid any cold sealing packing.

The publication of S. Akiyame et al. "The model rotor for the 6 MVA superconducting generator", L. 6 Sixth International Cryogenic Engineering Conference (I.C.E.C.6) May, 11-14, 1976, exists the rapport of which will be published by I.P.C. Service and Technology Press Ltd., 32, high Street, Guildford, Surrey, England.

All these documents seem to infer that the play of a rotating seal has a very great influence on the efficiency of the cooling system and that a minimal play is necessary to avoid cold floating linings.

If it is required to recuperate the helium at a temperature close to its input temperature, a second rotating seal must be used at the output. According to a second general arrangement, this second rotating seal could be placed on the opposite end of the rotor to that of the first rotating seal. This is then a hindrance in the case of a powerful machine on account of the presence of the drive shaft transmitting the mechanical power of the rotor. According to a third general arrangement, the second rotating seal can be placed at the same end of the rotor as the first. It is then necessary to use either a complex arrangement of seals, or to dispose one of the seals internally, i.e. to put it inside the other or inside pipes leading to the other and therefore immerse both its inner and its outer face in helium at a temperature close to 4° K. Taking into account its temperature, the rotation speeds used and the materials available, it is difficult to seal it adequately. The outer rotating joint, however can be sufficiently sealed by means of friction packings and of conventional guide bearings which operate at a temperature close to ambient temperature, since the outer seal surrounds the inner seal and can therefore have its outer face in thermal contact with the atmosphere. It results from this contact however, that the outer seal must have as small a diameter as possible to avoid thermal losses.

As for the inner rotating seal, it must allow a correct circulation, in the rotating rotor, of the helium which has passed through the stationary outer cooling device, this being applicable at the various rotation speeds of the rotor, e.g. 50 r. p. m. It is known, in an industrial sized machine, that there is a lashing action and shaft jumping action which are extremely difficult to suppress and which are incompatible with the forming of a more or less fluid-tight rotating seal. Indeed, the materials used at these temperatures cannot withstand the friction of the rotating part of the seal on its stationary part, even discontinuously. In practice, in the case of a bayonet seal, a radial play of more than 0.3 mm has never been considered. Now, in the case of a high-power machine, a lashing amplitude and shaft jump which are smaller than this radial play could only be obtained by means of extraordinary manufacturing precision which would certainly be very expensive, or by using guide bearings which are very close to the rotating seal and are very cumbersome there. In the case of a superconductive rotor cooled by means of a circuit of a known type, the defective sealing of an inner rotating seal would be revealed by the fact that the majority of the helium set in motion by the circulation means looped back on itself across the leakage of the inner seal, without entering the rotor. The result of this would be very poor efficiency of the cooling device, whose operation already expends a great amount of energy because of the very low temperatures used. That is why, despite numerous studies made throughout the world for producing a cryoalternator, none of the three general arrangements which come to the mind of the man in the art and which have been set forth hereinabove have been developed before the present invention into a device which could be used in practice for cooling a rotor of a high-power cryoalternator (above a few hundred megawatts) with sufficient reliability for the operating of this type of machine.

Preferred embodiments of the present invention produce an electric machine having a superconductive rotor provided with a cooling circuit fitted with rotating seals which make it possible to obtain effective cooling of the rotor simply.

SUMMARY OF THE INVENTION

The present invention provides an electric machine with a superconductive rotor provided with a cooling circuit having rotating seals, comprising:

A rotor rotating about an axis and in a peripheral zone of which heat is generated;

In the rotor, an internal cooling circuit enabling the circulation of a cooling fluid subjected to centrifugal force resulting from the rotating of this rotor and comprising rotary supply pipe in the axis of the rotor, a "first" pipes extending radially and connected to the rotary supply pipe and allowing the fluid to move away from the said axis to reach the peripheral zone, second, longitudinally extending pipes having a first end connected to the first radial pipes respectively and allowing the fluid coming from the first radial pipe to circulate in the peripheral zone, collecting the heat generated in this zone, second radial return pipes and outlet means for recovery of the cooling fluid which has crossed through the lower pipe;

On the outside of the rotor; a stationary external cooling circuit comprising a stationary supply pipe fluid connected to the rotary supply pipe by a rotating supply seal and a stationary outlet pipe collecting the cooling fluid leaving the rotor;

A cooling device connected in series between the stationary supply and outlet pipe for the cooling fluid;

Means are provided for making the cooling fluid circulate through this cooling device, the stationary and rotary supply pipes, the first pipes, the second pipes, the said outlet means and the said stationary outlet pipe;

Wherein said cooling fluid outlet means comprises respective third pipes connected to the second ends of respectively second pipe and allowing the cooling fluid to return towards the axis of the rotor and a rotary outlet pipe disposed along this axis and connected to the stationary outlet pipe by a rotary outlet seal coaxial with the supply seal in such a way that one of these two rotating seals is an inner rotating seal limiting the communication between the supply and outlet pipes, the other of these rotating seals being an outer rotating seal separating the space inside the cooling circuits from the space outside these circuits.

The rotating inner seal being of the "bayonet" type in which the two pipes connected by the seal are an outer pipe and an inner pipe, the outer pipe surrounding the inner pipe over an axial covering length leaving a radial gap between the adjacent surfaces of these two pipes, the radial gap between these adjacent surfaces being chosen greater than 0.6 mm at least when the rotor rotates at its highest speed, so as to enable the thermosiphon effect resulting from the rotating of the rotor and from the difference in temperature of the cooling fluid between the descending pipe and the rising pipe to make the cooling fluid circulate in the closed circuit consitituted by the inner circuit and by the leakage of the inner seal, this leakage passing through this radial gap.

An embodiment of the invention is described by way of example with reference to the accompanying drawings.

BRIEF DESCRIPTION OF THE DRAWINGS

FIG. 2 is an axial cross-sectional view of an inner seal ensuring the connection between two pipes of the said inner and outer cooling circuits of FIG. 1.

DESCRIPTION OF THE PREFERRED EMBODIMENT

Figure 1:
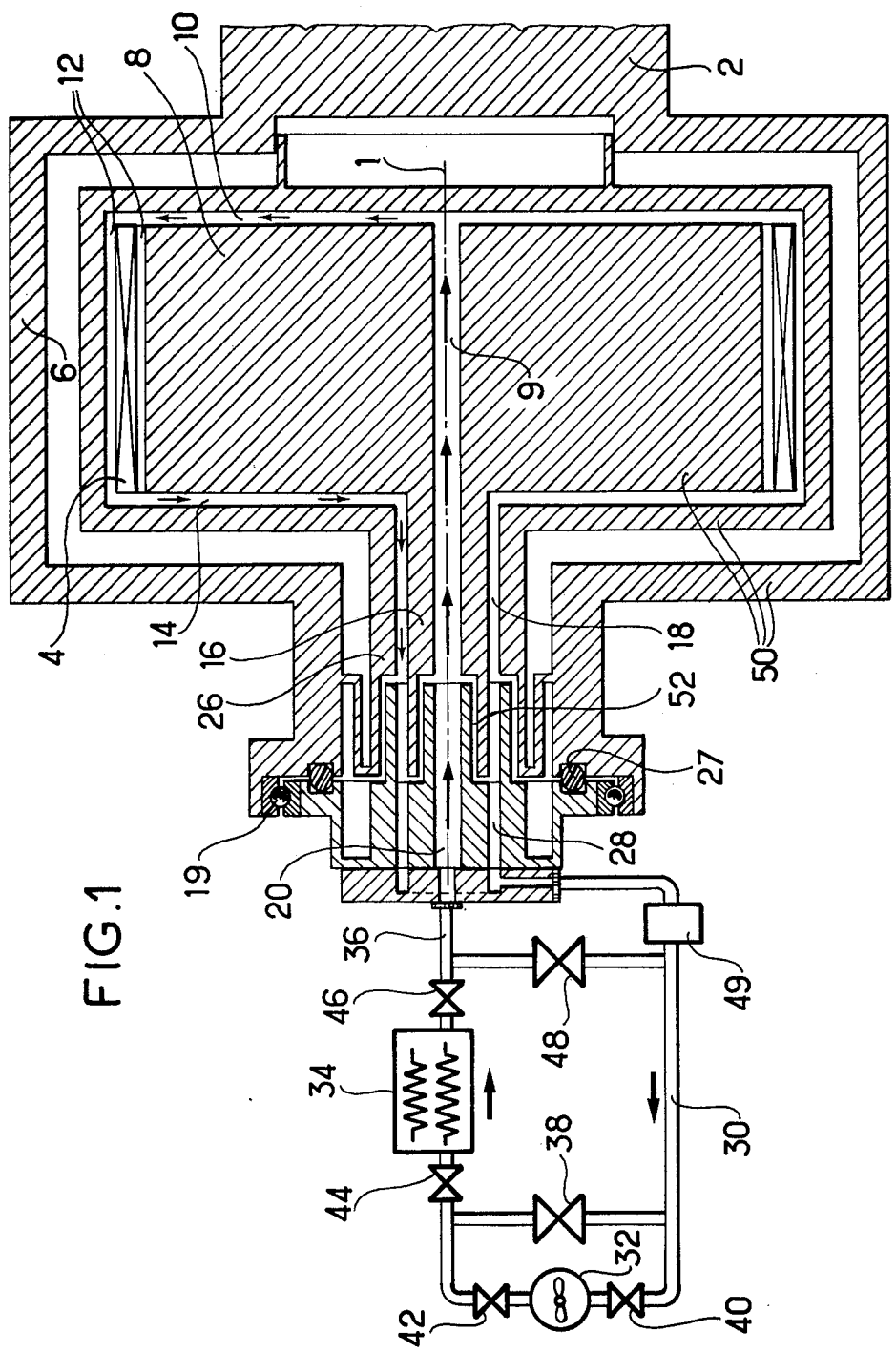
FIG. 1 is a partial axial cross-sectional view of the rotor of a cryoalternator provided with an inner cooling circuit and, diagrammatic view of a cooling circuit outside the rotor and connected to the inner circuit.

The rotating machine described is a cryoalternator having a power of at least 100 MW, e.g. 1 GW. A rotor 50 constitutes the inductor of this alternator. This rotor is rotated about an axis 1, at the synchronizing speed, e.g. 50 r.p.s. by means of a shaft 2. It includes two superconductive windings such as 4 fixed in the vicinity of its periphery on a frame 8 and shifted angularly by 180° about the axis 1.

Heat is generated in these windings because of the variable magnetic induction to which they are sometimes subjected and in the peripheral part of the frame 8, more particularly by thermal radiation from a vacuum enclosure 6 surrounding the frame 8. To keep the windings such as 4 at a temperature close to 4° K, a discharge of heat must therefore be arranged. For this purpose, an inner cooling circuit is provided comprising, in a conventional manner, a peripheral part in thermal contact with the windings such as 4, an axial part through which the supply and the discharge of the cooling fluid (helium) are effected and parts ensuring communication between the peripheral parts and axial parts. The fluid circulating in this circuit is obviously subjected to the centrifugal force resulting from the rotation of the rotor. Its pressure is therefore higher in the peripheral part of the circuit than in its axial part, just as under the effect of gravity, the pressure of a fluid in a stationary circuit is higher in its lower part than in its upper part. This is why the elements of the cooling circuit of the rotor situated respectively near to the axial of this rotor and at its periphery have been called "upper or radially inner" and "lower or radially outer" elements and will be called so hereinbelow.

The radially inner cooling circuit described here is intended to transfer the heat from the rotor to the radially outer cooling circuit. Going from the fluid inlet to the fluid outlet il comprises the four following pipes or groups of pipes.

An "upper" or axial channel 9 having a diameter of at least 50 mm extends along the axis of the rotor between an end close to the fluid inlet and an end spaced away from this inlet. This channel 9 is made up of a rotary supply pipe 16 integral with the rotor and a coaxial stationary supply channel 20 which acts as an extension of the rotary pipe 16.

Two "descending" channels or first radial pipes such as 10 are disposed radially at 180° from each other, connected to the said "farther" end of the upper channel 9 and allow the fluid to reach the peripheral zone of the rotor.

Two "lower" channels or second longitudinal pipes within the rotary periphery such as 12 are connected to the descending channels 10 and allowing the fluid coming from these descending channels to circulate in contact with the windings such as 4 cool them. These channels have a general longitudinal direction parallel to the axis 1.

Lastly, two "rising" channels or third pipes such as 14 are disposed radially at 180° to each other extends radially and are connected to the lower channels 12 and allow the fluid to return to the vicinity of the axis. This fluid is removed by an outlet channel 18 which is integral with the rotor and hence rotary and which is connected by a rotary seal disposed around a stationary outlet channel 28. The outlet channels 18 and 28 are disposed coaxially round the supply channel 9. The outer seal 26 is fluid-tight and can be, for example, of the type described in a communication by Messrs. Joseph L. SMITH jr. and Thomas A. KEIM (National Advanced Study Institute Extrevues, Italy, Sept. 5-14, in "Superconducting Machines and Devices," Plenum Press, New York and London). Its fluid-tight end is provided with friction packing 27 at ambient temperature. It is guided by a ball bearing 19.

The stationary outlet channel 28 forms a part of a cooling circuit outside the rotor which is intended to ensure the cooling of the helium before its reinjection into the inner cooling circuit. The channel 28 is connected to a pipe 30 which can convey the helium to a circulation means 32 in series with a cooling device 34 of a known type. The helium cooled by this cooling device is sent into a pipe 36 which is connected to the stationary supply channel 20. A valve 38, called, here, the "main valve," is connected in parallel with the circulation means 32, so that when it is open, a flow of helium sufficient for ensuring the cooling of the rotor can cross through it with a low loss of head before passing through the cooling device 34, it then being possible to stop the circulation device 32 and to take it out of circuit.

This flow is ensured by the "thermosiphon" phenomenon, which makes the rotor 50 fulfill the function of a pump. This phenomenon can be explained as follows: the fluid in the descending channels or first pipe 10 is at a temperature lower than that of the fluid in the rising channels or third pipes 14, because it heats up when in contact with the windings 4. The result of this is a greater density in the descending channels. On account of cenrifugal force, this difference in density tends to accelerate the circulation of the fluid in a closed circuit. The flow cross-sections of the valve 38, of the cooling device 34 and of the channels are so chosen that the pumping power of the thermosiphon phenomenon itself ensures a suitable discharge of helium. The circulation device 32 must however be used during the starting up of the rotor 50. The valve 38 is then closed and the circulation device 32 fulfills two functions: firstly, it supplies the pumping power necessary for the circulation of the helium, when the power of the thermosiphon phenomenon is insufficient because of the low rotation speed of the rotor 50; and secondly, it imposes an initial circulation direction on the helium, this making it possible subsequently for the thermosiphon phenomenon the occur and to maintain the circulation in this direction. After the starting up, the valve 38 is opened and the circulation device 32 is stopped.

The flow device can be isolated from the cooling circuit by two protection valves 40 and 42 for example if it is required to repair it.

Likewise, if it is required to repair the cooling device 34, it can be isolated by closing two protection valves 44 and 46. In this case, the external cooling of the helium is no longer ensured. Therefore, it is necessary to stop the rotor 50 at least temporarily and to put the alternator which includes the rotor out of service. Heat nevertheless continues to be generated for some time in the rotor 50 and can damage the windings such as 4. This is why an "auxiliary" valve 48, which can be identical to the main valves 38 is provided. It is normally closed. The opening thereof makes it possible to put not only the circulation device 32 but also the cooling device 34 out of circuit while enabling the helium to continue to circulate in a closed circuit, due to the thermosiphon phenomenon, as long as the rotor 50 rotates and as the temperature of the windings 4 or of the peripheral part of the rotor 50 remaining less than the critical temperature of the superconductor. It is possible to insert a reserve capacity of helium 49 in the circuit; this mass of helium being progressively heated is sufficient to absorb the heat generated before the complete stopping of the alternator. Such a reserve can provide (if it is large enough) the alternator with an autonomy which is sufficient to enable the repairing of the cooling device 34 or the starting up of another alternator before the stopping of the alternator described here.

It appeared preferable that, as shown and described, the outlet pipes have a diameter greater than that of the supply pipes and contain these latter. The advantage of this is that the bringing in of heat from the outside heats up the helium which has already been in the rotor and that the leakages around the outer rotating seal effects this same heated helium. Of course, this bringing in of heat and these leakages are made as small as possible. Moreover, such a disposition can in certain cases, make it possible avoid the need for any circulation device such as 32 to impose an initial flow direction on the helium. Indeed, the outlet diameter being greater than the supply diameter sets up a centrifugal pumping effect which can occur only in the proper direction. With a view to reducing the bringing in of heat, the diameter of the outlet pipe is, however, chosen to be smaller than that which would be necessary for using the centrifugal pumping phenomenon the full advantage. This diameter is, for example, 50 mm. The use of the centrifugal pump for cooling an alternator has already been described in U.S. Pat. No. 3,089,969 by Wiedeman, with the use of an outlet seal having a large diameter.

It must be understood, moreover, that when the circulation device 32 is not used, the circulation of the cooling fluid through the cooling device 34 is ensured only if the inner seal (52) provides some degree of fluid-tight sealing. In practice, the radial gap between the two pipes connected by this seal must be less than 2 mm if it is of the bayonet type. However, when the circulation device (32) is used, circulation is ensured through the cooling device and the radial gap could be chosen even larger if necessary. But, this is not very probable. Still by way of an example, in the case of an alternator having a power of about 1 GW, rotating at 50 r.p.s., with a rotor diameter of about 1 meter, the helium discharge can be 100 to 200 g/s in the inner cooling circuit at a pressure of a few bars in the vicinity of the axis. The supply temperature can be about 4° K and the outlet temperature can be a little higher, e.g. 5° K. In these conditions, the thermosiphon phenomenon can provide the equivalent of a pump pressure in the order of 30 millibars. The flow device can provide a discharge of 100 to 200 g/s at a manometric height in the order of 50 millibars.

The inner seal 52 and the parts in the vicinity of the rotary supply pipe 16 and the stationary supply channel 20 and of the stationary outlet channel 28 are shown on a larger scale and in greater detail in FIG. 2.

The rotary supply pipe 16 is connected to the supply channel 20 through a movable pipe 54 which does not rotate but which is axially movable 1 and has the same internal diameter as channel 20 and pipe 16. These three elements are aligned along the rotor axis. The movable pipe 54 passes through the end 56 of the stationary outlet channel 28 which is connected to a portion of the pipe 30 perpendicular to the axis 1. Fluid-tight sealing between the pipes 28 and 54 is ensured by a friction seal 58 clamped by a nut 60 and situated at the outer end of a sleeve 62 surrounding the pipe 54 over a length of 10 to 30 cm, leaving a sufficient play, e.g. 0.2 mm.

This arrangement enables the seal 58 to remain at a temperature close to ambient temperature. The movable pipe 54 can be connected in an analogous manner to the stationary pipe 20 whose end nearest to the rotor is fitted with a sleeve 64 surrounding the end of the pipe 54, a sealing ring 66 clamped by a nut 68 being used.

The walls of the pipes 28, 54 and 20 are hollow and a vacuum is maintained in within them, the walls having a thickness in the order of 1 to 3 mm and being made of stainless steel which is a poor heat conductor so as to form a sufficient heat insulation.

The movable pipe 54 is guided by two supports 70 and 72 fitted with friction parts 74 and 76.

Between these two supports, the pipe 54 is fitted with a drive stud 78 making it possible to move it axially by means of a lever 80 rotating about an axis 82 perpendicular to the plane of the figure which passes through this lever and the axis 1 of the rotor.

The connecting of the rotary supply pipe 16 to the movable pipe 54 is affected by a seal of the "bayonet" type in which the pipe 16 is external and the pipe 54 is internal, i.e. an extension 84 of the pipe 16 surrounds an extension 86 of the pipe 54 over a covering length which extends parallel to the axis 1.

When, under the effect of the lever 80, the movable pipe 54 is brought as close as possible to the pipe 16, stud 78 occupying the rightmost dotted line position, FIG. 2, the end of the extension 86 abuts against a stop surface 88 formed on the pipe 16 by the part of the section of the wall of this pipe situated the nearest to the axis 1 and not occupied by the extension 84. The end contact could also be provided at the other end of the bayonet. In this case, the end of the extension 84 would abut against a stop surface 90 formed on the pipe 54 by the part of the section of the wall on this pipe situated the farthest from the axis 1 and not occupied by the extension 86. A simultaneous contact at the two ends is obtained if the lengths of the extensions 84 and 86 are equal. Fluid-tight sealing is then ensured between the pipes 16 and 54, by metal-to-metal contact or by means of packing (not shown), made of polytetrafluorethylene but the pipe 16 must then be stationary, i.e. the rotor must not rotate. This "closed" position is therefore used only when the alternator is stopped, when it is required to keep the rotor cold.

The movable pipe 54 can also, under the effect of the lever 80, be moved a little further away from the rotary pipe 16 so as to leave an axial gap of 2 mm between the ends of the extensions 84 and 86 and the stop surfaces 90 and 88 respectively. The pipe 54 is then in an "intermediate" position shown in FIG. 2 and the radial gap existing between the adjacent faces of the extensions 84 and 86 has two different values.

The inner extension 86 comprises two distinct zones: a zone 92 close to its end and a zone 94 further away from its end. These two zones have a same length of 5 to 20 cm, parallel to the axis 1, but the radial dimension of the extension 86 towards the extension 84 is less in the zone 92 than in the zone 94, i.e. since the extension 84 surrounds the extension 86, the distance between the outer face of the extension 86 and the axis 1 is shorter in the zone 92 close to the end than in the zone 94 further from the end.

The outer face of the extension 86 is in the shape of a cylinder of revolution in each of these zones with a shorter radius in the zone 92 and a longer radius in the zone 94. In contrast the inner face of the extension 84 is in the shape of a cylinder of revolution over its whole length with a radius of 10 to 20 mm. The radial gap between the outer face of the extension 86 and the inner face of the extension 84 is comprised between 1 mm and 2 mm in the zone 92 and it is comprised between 0.6 and 1 mm in the zone 94.

In these two zones, the adjacent faces of the extensions 84 and 86 have annular grooves such as 96, having a depth of 1 to 5 mm and an identical width spaced out at a pitch of 2 to 10 mm, so as to make the flow of the cooling fluid more difficult in the gap between these adjacent faces. The radial gap in the zone 94 is chosen to be slightly greater than the manufacturing tolerances of the parts and in the alignments. Indeed, it is the zone 94 which because of the small dimension of the radial gap, limits the discharge of leakage of this fluid through this gap.

This intermediate position is used when the rotor rotates at a low speed, namely about 100 r.p.m., for example at the time of the initial subjecting of the rotor to cold conditions.

It is further possible, by means of the lever 80, to place the movable pipe 54 in a position which is as far as possible from the rotary pipe 16, represented by the stud 78 shifted to the leftmost dotted line position, FIG. 2. In this remote position, only the zone 92 remains adjacent to the extension 84. The radial gap is then sufficiently large to be compatible with the lashing and jumps of the shaft, i.e. with the movements of the rotary pipe 16 which are perpendicular to the axis 1. These movements are practically inevitable when the rotor rotates at full speed. In the case where the mechanical stability of the rotor shows considerably reduced lashing and these shaft jumps the radial gap in the zone 92 can be smaller. Taking manufacturing difficulties into account it does not seem, however, advisable to reduce it to less than 0.6 mm in a highpower machine.

Of course, the result obtained by the disposition described, i.e. the fact that the radial gap can be increased between the extensions 84 and 86 by moving the pipe 54 axially away, could also be obtained by a slightly different disposition, e.g. by imparting to the faces adjacent to these two extensions the shape of two cones of revolution about the axis 1 with the same angle at the apex.

The present invention has the following advantages: there are no cold friction packings, hence no maintenance. There is no guiding by bearings or the like in the vicinity of the seals, as this would give rise to a great complexity in structure and severe maintenance requirements.

The leakage of the inner seal does not reduce the efficiency of the cooling inasmuch as concerns the cooling of the rotor. This is due to the fact that the thermosiphon effect is generated inside the rotor and that the leakage discharge due to the lack of sealing in the seal circulates inside the rotor and not outside it through the cooling device. If the helium were driven mainly by outside means such as the circulation device (32) the leakage discharge would circulate through the cooling device, and this would make it necessary to overdimension the latter.

What we claim is:

1. An electric machine with a superconductive rotor provided with a cooling circuit having rotating seals, comprising:

a rotor mounted for rotation about its axis and having a peripheral zone of which heat is generated;

an internal cooling circuit in said rotor enabling the circulation of a cooling fluid subjected to centrifugal force resulting from the rotating of this rotor, said circuit comprising a rotary supply pipe within the axis of the rotor, first pipes extending radially outward from the rotary supply pipe and allowing the fluid to move away from said axis to reach the rotor peripheral zone, second pipes extending longitudinally within said rotor peripheral zone having a first end connected to respective first pipes and allowing the fluid coming from this descending pipe to circulate in the peripheral zone, collecting the heat generated in this zone; outlet means for the cooling fluid which has crossed through the second pipes;

a stationary external cooling circuit outside of said rotor comprising a stationary supply pipe, a rotating supply seal connecting said stationary supply pipe to said rotary supply pipe, and a stationary outlet pipe collecting the cooling fluid leaving the rotor;

a cooling device connected in series between the stationary supply and outlet pipes for cooling the cooling fluid;

means for circulating the cooling fluid through said cooling device, the stationary and rotary supply pipes, the first pipes, the second pipes, said outlet means and said stationary pipe;

said cooling fluid outlet means comprising third pipes connected to the second end of respective second pipes and extending radially to allow the cooling fluid to return towards the axis of the rotor and a rotary outlet pipe disposed along said axis and connected to the stationary outlet pipe by a rotary outlet seal coaxial with the supply seal, one of these two rotating seals forming an inner rotating seal limiting the communication between the supply and outlet pipes and the other of said rotating seals forming an outer rotating seal separating the space inside the cooling circuits from the space outside these circuits;

said rotating inner seal being of the "bayonet" type in which the two pipes connected by the seal comprise an outer pipe and an inner pipe, the outer pipe surrounding the inner pipe extending over an axial covering length forming a radial gap between the adjacent surfaces of these two pipes, the radial gap between these adjacent surfaces being greater than 0.6 mm at least when the rotor rotates at its highest speed, so as to enable the thermosiphon effect resulting from the rotating of the rotor and from the difference in temperature of the cooling fluid between the first pipes and the third pipes to make the cooling fluid circulate in a closed loop constituted by the inner circuit and by the leakage of the inner seal through said radial gap.

2. The machine according to claim 1, wherein said means for circulating the cooling fluid further comprises a circulation device outside the rotor and connected in series with the cooling device between the stationary supply and outlet pipes.

3. The machine according to claim 2, wherein a main valve is connected in parallel to said circulation device; said radial gap of the inner seal is less than 2 mm; the flow cross-sections of the pipes of said cooling device and of said main valve are chosen so that the thermosiphon effect resulting from the rotation of the rotor and from the fact that the cooling fluid is less cold in the third pipes than in the first pipes sets up in said cooling circuits a discharge of said fluid sufficient for suitable cooling of said rotor when the main valve is open, and means for preventing said circulation device from operating and the rotor rotating at a speed higher than a predetermined threshold.

4. The machine according to claim 3, wherein an auxiliary valve connects said stationary supply pipe to said stationary outlet pipe without passing through said cooling device nor through said circulation device.

5. The machine according to claim 4, wherein the inner cooling circuit further comprises a reserve volume of cooling fluid sufficiently great to enable, in the case of accident, the heat given off before the stopping of the rotor to be absorbed without exceeding a temperature enabling the rotor to remain superconductive.

6. The machine according to claim 1, wherein said two pipes connected by said inner seal have at least one of the two adjacent faces thereof varying in radius as the end of the pipe to which this surface belongs is approached, this radius varying in the direction which tends to increase the distance between this surface and that of the other connected pipe, one of said two connected pipes comprising an axially movable pipe which is movable in relation to the other of said two connected pipes in a direction parallel to the axis, such that when this movable pipe is moved towards the other connected pipe to increase the covering length, there results a reduction in the radial gap therebetween, which gap constitutes a leakage path for the cooling fluid, and means for moving the movable pipe to increase the covering length and reduce the leakages of the inner seal when the rotation speed of the rotor is reduced and to reduce the covering length and increase the radial gap between the two pipes at the inner seal when the rotation speed of the rotor increases.

7. The machine according to claim 6, wherein said means for moving said movable pipe comprises means for moving said movable pipe between a close axial position with respect to said other of said two connected pipes in which leakage of the fluid through the seal is minimum and a remote position with slight covering length of one of said two connected pipes with respect to the other wherein the radial gap between said connected pipes is maximum.

8. The machine according to claim 7, wherein said two pipes connected by said inner seal abut axially in said close position when the rotor is stopped.

9. A machine according to claim 7, wherein at least a first of the two pipes connected by the inner seal has, in the covering length and in the close position, a zone close to its end in which its radial extension towards the other connected pipe is less than in a zone further away from its end, so that the radial gap is greater in this close zone than in this remote zone, the remote position being sufficiently far away from the close position for the farthest zone from the end of the first pipe, in the remote position, to be outside the covering length.

10. The machine according to claim 9, wherein said movable pipe of said two connected pipes takes an intermediate position, when the rotor rotates at low speed, between said close and remote positions, with the two pipes connected by said inner seal abutting axially in said close position, and having maximum covering length, having reduced covering length in the intermediate position and being uncovered in the remote position.

11. A machine according to claim 6, wherein at least one of the pipes connected by the inner seal has, in the covering length, annular grooves adjacent to the other connected pipe.

12. A machine according to claim 1, having an operating power of more than 100 Mw.

* * * * *